United States Patent
Brettschneider

(10) Patent No.: US 7,390,245 B2
(45) Date of Patent: Jun. 24, 2008

(54) METHOD FOR PRODUCING A SLEEVE THAT HAS A GREATER LENGTH AND IS USED FOR FOOD

(75) Inventor: Hartmut Brettschneider, Breitenbrunn (DE)

(73) Assignee: CDS-Crailsheimer Darmsortierbetrieb GmbH, Crailsheim (DE)

( * ) Notice: Subject to any disclaimer, the term of this patent is extended or adjusted under 35 U.S.C. 154(b) by 396 days.

(21) Appl. No.: 10/499,864

(22) PCT Filed: Apr. 9, 2001

(86) PCT No.: PCT/EP01/04047

§ 371 (c)(1),
(2), (4) Date: Apr. 15, 2005

(87) PCT Pub. No.: WO01/76377

PCT Pub. Date: Oct. 18, 2001

(65) Prior Publication Data

US 2006/0246189 A1    Nov. 2, 2006

(30) Foreign Application Priority Data

Apr. 7, 2000    (DE) .............................. 100 17 172

(51) Int. Cl.
    *A01K 11/00*    (2006.01)
(52) U.S. Cl. ...................................... 452/35
(58) Field of Classification Search ............ 156/73.1, 156/73.4, 157, 158, 272.2, 272.8
    See application file for complete search history.

(56) References Cited

U.S. PATENT DOCUMENTS

| | | | | |
|---|---|---|---|---|
| 3,716,614 A * | 2/1973 | Okamoto et al. | ............... | 264/49 |
| 4,478,658 A * | 10/1984 | Wittwer | ..................... | 156/69 |
| 4,610,742 A * | 9/1986 | Rop et al. | ................... | 156/158 |
| 4,689,854 A * | 9/1987 | Wakefield et al. | ............. | 452/47 |
| 4,702,496 A * | 10/1987 | Hume, III | .................. | 281/15.1 |
| 4,788,686 A * | 11/1988 | Mentel | ......................... | 372/37 |
| 4,972,547 A * | 11/1990 | Townsend et al. | ........... | 426/105 |
| 4,972,548 A * | 11/1990 | Townsend et al. | ........... | 426/138 |
| 5,399,213 A * | 3/1995 | Oxley | ........................... | 156/86 |
| 5,916,644 A * | 6/1999 | Stanton et al. | ............. | 428/34.8 |
| 6,616,521 B1 * | 9/2003 | Townsend | .................... | 452/32 |
| 2007/0134333 A1 * | 6/2007 | Thomas et al. | ............... | 424/486 |

* cited by examiner

*Primary Examiner*—Thomas Price
(74) *Attorney, Agent, or Firm*—Horst M. Kasper

(57) ABSTRACT

The invention relates to a method for producing a sleeve that has a greater length and is used for food, especially for sausages. The inventive sleeve consists of a plurality of individual sleeve sections made of sausage casings which contain collagens. According to the inventive method, a mandrel (3) is used. A first sleeve section (1) is pushed on said mandrel and a successive second sleeve section (2) is also pushed on said mandrel in such a way that the end regions of the two sleeve sections overlap on the mandrel and that an overlapping region (10) of sleeve sections is formed, whereby said end regions face each other. Heat and pressure are temporarily and simultaneously exerted on the overlapping region of the two sleeve sections in such a way that the sleeve sections in the overlapping region are at least partially welded together.

20 Claims, 1 Drawing Sheet

METHOD FOR PRODUCING A SLEEVE THAT HAS A GREATER LENGTH AND IS USED FOR FOOD

BACKGROUND OF THE INVENTION

1. Field of the Invention

Figure 1:
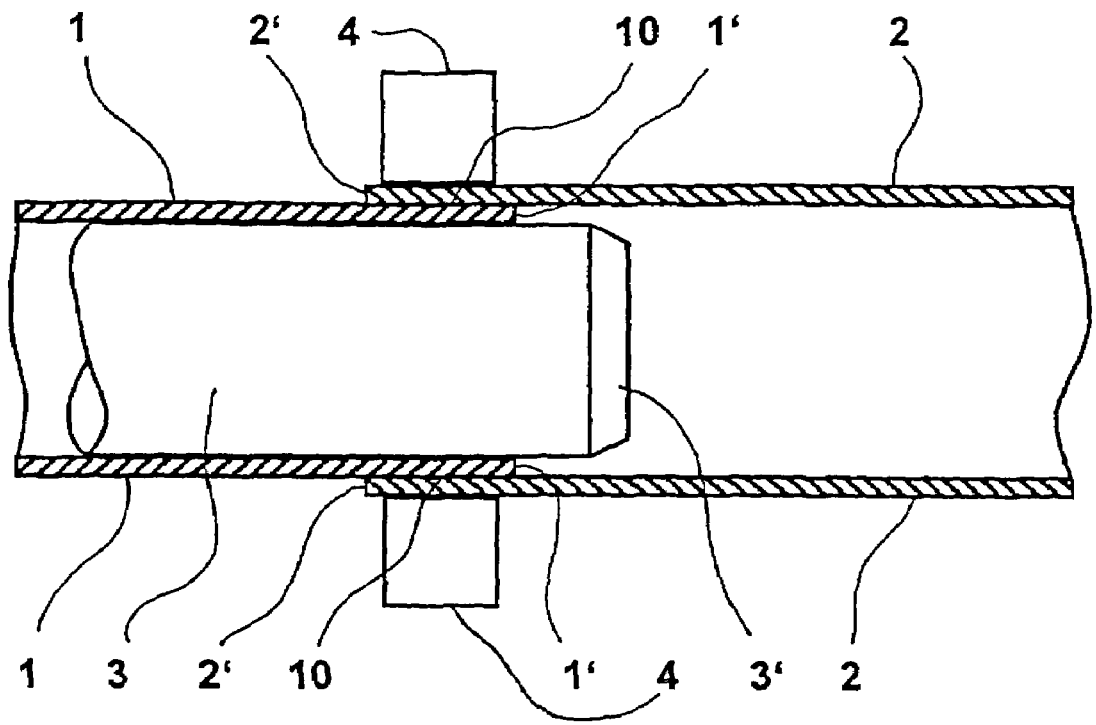

The invention relates to a method according to the generic part of claim 1.

The invention relates to a method for the production of a casing with a longer length for foodstuffs.

2. Brief Description of the Background of the Invention Including Prior Art

Particularly in meat-processing plants or in the meat industry, casings or intestines (for example, natural or synthetic intestines) are needed for the production of sausages whereby, for purposes of efficient manufacturing, to the extent possible, they should be present in the form of endless material or at least in longer lengths. Especially natural intestines are normally only available in shorter lengths, which impairs efficient manufacturing.

German patent DE 679 748 discloses a process for the production of long sausage casings which is based on the technique of inserting the end pieces of intestines into each other and then sewing or gluing them together, an approach which involves a considerable amount of work and time.

German patent DE 30 29 808 C2 discloses a process for positioning on a shared sleeve several natural intestine sections into which meat is to be filled. Here, the intestine sections are slipped over the sleeve in such a way that two consecutive intestine sections overlap. The end of the first intestine section is inserted into the beginning of the second, the end of the second into the beginning of the third, etc., so that a kind of continuous intestine is created. The individual intestine sections, however, are not joined to each other here.

SUMMARY OF THE INVENTION

1 Purposes of the Invention

The objective of the invention is to provide a process that, in an efficient manner, allows the production of a continuous sequence of sections that are securely joined to each other and that are made up of a plurality or numerous individual casing sections which can be sections of natural intestine.

3. BRIEF DESCRIPTION OF THE INVENTION

This objective is achieved according to the invention by a process for the production of a casing with a longer length for foodstuffs, especially for sausages, said casing comprising a plurality of individual casing sections made of natural intestines, which contain collagen, using a mandrel onto which a first casing section is pushed and onto which a subsequent second casing section is likewise pushed in such a way that the ends of the two casing sections facing each other overlap on the mandrel, thus forming an overlapping area of casing sections, whereby heat and pressure are simultaneously applied for some time to the overlapping area of the two casing sections in such a way that the casing sections in the overlapping area are at least partially fused together.

The method according to the invention serves to join several pieces of a tube-like casing containing collagen for foodstuffs, especially sausages, in order to obtain an "endless" material, if at all possible, for the production of foodstuffs in a skin or casing or intestine surrounding said food, especially sausages.

The overlapping area can be heated electrically or by means of irradiation with electromagnetic radiation or by means of irradiation with ultrasound. Laser light, infrared radiation or microwave radiation, for example, can be employed as the electromagnetic radiation. The overlapping area or the collagen material is preferably heated to a temperature of up to 200° C. [392° F.].

In an embodiment of the invention, the overlapping area is fused together by being arranged in the pressure or pinch gap of a heatable tool.

The overlapping area is preferably arranged in an annular gap between at least one heatable inner jaw and at least one heatable outer jaw that surrounds the former concentrically, whereby the annular gap can be constricted at least in sections by means of at least one mechanism in such a way that at least part of the overlapping area is exposed to the contact pressure and, at the same time, the jaws are heated.

The inner jaw can be arranged inside the mandrel or else upon it. In an embodiment of the invention, the inner jaw can be heated by a first heatable insert and the outer jaw can be heated by a second heatable insert.

Instead of casing sections made of natural intestines, the method can also be carried out using synthetic intestines containing collagen material.

Figure 2:
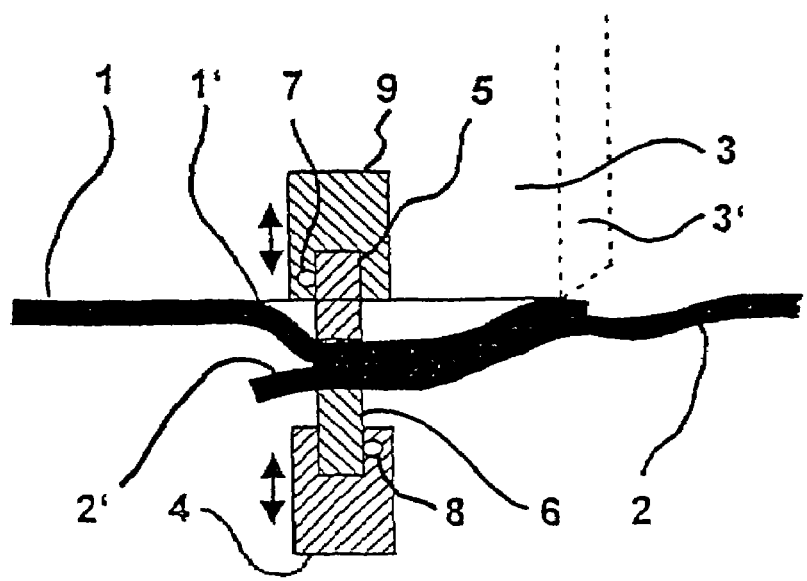

Brief description of the drawing in which the following is shown:

FIG. 1 two overlapping casing sections, whereby the first casing section is arranged on a mandrel and the overlapping area is located between an outer jaw and the mandrel, FIG. 2 a detail of FIG. 1 whereby, in contrast to FIG. 1, the mandrel, the inner jaw and the outer jaw are each shown in a cross sectional view.

DESCRIPTION OF INVENTION AND PREFERRED EMBODIMENTS

Preferred embodiments of the invention are explained in greater detail below with reference to FIGS. 1 and 2, each of which shows preferred devices for carrying out the method according to the invention in a greatly simplified representation.

FIG. 1 shows two overlapping casing sections 1 and 2 containing collagen that are to be joined together, whereby the first casing section 1 is arranged on a mandrel 3. An end area 2' of the second casing section 2 is pushed onto the mandrel 3, which has a free end 3', in such a way that an end area 1' of the first casing section overlaps with the end area 2' of the second casing section near the free end 3' of the mandrel 3, whereby the overlapping area 10 is located between an outer jaw 4 and the mandrel 3. FIG. 1 shows the outer jaw 4 and the mandrel in a top view, but the casing sections 1 and 2 in a cross sectional view.

The two end areas 1' and 2' are joined to each other in that the overlapping area 10 is exposed to heat and pressure, whereby the joining of the end areas 1' and 2' of the two casing pieces 1 and 2 is achieved through the denaturizing of the collagen material.

FIG. 2 shows a detail of FIG. 1. The heating as well as the application of pressure are done by means of at least one inner jaw 9 and one outer jaw 4 (FIG. 2). In contrast to FIG. 1, FIG. 2 shows not only the casing sections 1, 2, but also the mandrel 3, the inner jaw and the outer jaw 9, 4, each in a cross sectional view.

The inner jaw 9 has a heatable insert 5 and the outer jaw 4 has a heatable insert 6. The inner jaw is arranged on the mandrel 3 and, in one embodiment, lies flush with its outer surface.

In an embodiment (not shown), the outer jaw 4 is at a relatively large distance from the mandrel 3. By means of an adjustment mechanism (not shown), the outer jaw 4 can be moved into a working position towards the inside in the direction of the mandrel 3 in such a way that the jaw 4 tightly encloses the overlapping area 10 along a continuous line, so that said overlapping area 10 is held in the pinch or working gap formed between the mandrel end 3' and the jaws 4.

In a preferred embodiment, in an analogous manner, the inner jaw 9 as well can be moved radially with respect to the mandrel 3. The direction of movement of the jaws 4, 9 are each shown in FIG. 2 with . . . [Translator's note: this sentence is incomplete].

In another embodiment of the invention, a jaw arrangement having several jaws 4 is provided around the free end 3' of the mandrel 3. The jaws 4 are heated and can be moved radially with respect to the mandrel 3 out of a starting position, in which the jaws 4 are at a relatively large distance from the mandrel 3, into a working position in which the jaws 4 tightly enclose the overlapping ends 1' and 2' along a continuous line, so that the ends 1', 2' are held in the pinch or working gap formed between the mandrel end 3' and the jaws 4.

The delimiting surfaces of the pinch or working gap can each be formed by annular segmented inserts 5 arranged on the mandrel 3 or on the inner jaws 9 and by annular segmented inserts 6 of the outer jaws 4.

The temperature of the jaws 4 and/or the time duration during which the jaws 4 remain in the working position are selected in such a way that, in the overlapping area 10, the end areas 1' and 2' of the casing sections 1, 2, are joined or fused, namely, without damaging and without burning the material containing collagen. Specifically, the time and temperature are selected in such a way that, even taking the existing moisture into account, the crosswise bond between the collagen filaments is briefly eliminated and then reconstituted during the cooling phase, namely, precisely between the end areas 1' and 2'. In detail, the temperature of the jaws 4 and the treatment time are set in such a way that the temperature in the material of the ends 1' and 2' lies approximately in the range up to 200° C. [392° F.].

The mandrel 3 as well as the jaws 4, 9 preferably consist of a thermally insulating material, at least in the area of the heatable inserts 5 and 6, so that only the inserts 5 and 6, with their relatively low weight, have to be heated and thus a fast and precise temperature regulation is also possible using sensors 7 and 8 (temperature measuring sensors) that are provided on the heatable inserts 5 and 6.

The heat energy needed for the fusing can also be generated in another manner at the joining area between the ends 1' and 2', for example, by ultrasound, by high frequency or microwave radiation as well as by laser light.

COMMERCIAL APPLICABILITY

The invention can be employed commercially for the production of a continuous natural intestine casing for the production of foodstuffs, especially sausages.

LIST OF REFERENCE NUMERALS

1, 2 casing pieces
1', 2' casing end
3 mandrel
3' mandrel end
4, 9 inner, outer jaw
5, 6 heatable inserts of 4, 9
7, 8 temperature sensor
10 overlapping area

The invention claimed is:

1. A method for the production of a casing with a longer length for foodstuffs, especially for sausages, said casing comprising a plurality of individual casing sections (1, 2) made of natural intestines which contain collagen, using a mandrel (3) onto which a first casing section (1) is pushed and onto which a subsequent second casing section (2) is likewise pushed in such a way that end areas (1', 2') of the two casing sections (1, 2) facing each other overlap on the mandrel (3), thus forming an overlapping area (10) of casing sections (1, 2), characterized in that heat and pressure are applied simultaneously for some time to the overlapping area (10) of the two casing sections (1, 2) in such a way that the casing sections (1, 2) in the overlapping area (10) are at least partially fused together.

2. The method according to claim 1, characterized in that the overlapping area (1*, 2') is heated electrically or by irradiation with electromagnetic radiation or by irradiation with ultrasound.

3. The method according to claim 2, characterized in that laser light, infrared radiation or microwave radiation are employed as the electromagnetic radiation.

4. The method according to claim 1, characterized in that the overlapping area (10) or the collagen material is heated to a temperature of up to 200° C. [392° F.].

5. The method according to claim 1, characterized in that the overlapping area (10) is fused together by being arranged in a pressure or pinch gap of a heatable tool.

6. A method for the production of a casing with a longer length for foodstuffs, especially for sausages, said casing comprising a plurality of individual casing sections (1, 2) made of intestines which contain collagen, using a mandrel (3) onto which a first casing section (1) is pushed and onto which a subsequent second casing section (2) is likewise pushed in such a way that end areas (1', 2') of the two casing sections (1, 2) facing each other overlap on the mandrel (3), thus forming an overlapping area (10) of casing sections (1, 2),
characterized in that heat and pressure are applied simultaneously for some time to the overlapping area (10) of the two casing sections (1, 2) in such a way that the casing sections (1, 2) in the overlapping area (10) are at least partially fused together, for which purpose the overlapping area (10) is arranged in a pressure or pinch gap of a heatable tool where the fusing takes place, while retaining the tube-like casing.

7. The method according to claim 6, characterized in that, the casing sections (1, 2) are made of natural intestine.

8. The method according to claim 7, characterized in that the overlapping area (10) is heated electrically or by irradiation with electromagnetic radiation or by irradiation with ultrasound.

9. The method according to claim 8, characterized in that laser light, infrared radiation or microwave radiation are employed as the electromagnetic radiation.

10. The method according to claim 7, characterized in that the overlapping area (10) or the collagen material is heated to a temperature of up to 200° C. [392° F.].

11. The method according to claim 7, characterized in that the overlapping area is arranged in an annular gap between at least one heatable inner jaw (9) and at least one heatable outer jaw (4) that surrounds the former concentrically, whereby the annular gap can be constricted at least in sections by a mechanism in such a way that at least part of the overlapping area (10) is exposed to the contact pressure and, at the same time, the jaws (4, 9) are heated.

12. The method according to claim 6, characterized in that, casing sections made of synthetic intestines containing collagen are used for carrying out the method.

13. A device for the production of a casing with a longer length for foodstuffs, especially for sausages, said casing comprising a plurality of individual casing sections (1, 2) made of natural intestines which contain collagen, using a mandrel (3) onto which a first casing section (1) is pushed and onto which a subsequent second casing section (2) is likewise pushed in such a way that the end areas (1', 2') of the two casing sections (1, 2) facing each other overlap on the mandrel (3), thus forming an overlapping area (10) of casing sections (1, 2), characterized in that the overlapping area (10) is arranged in the pressure or pinch gap of a heatable tool by means of which heat and pressure can be applied simultaneously for some time to the overlapping area (10) of the two casing sections (1, 2), as a result of which the casing sections (1, 2) are fused to each other at least partially in the overlapping area (10), while retaining the tube-like casing.

14. The device according to claim 13, characterized in that the overlapping area (10) is located between a heatable outer jaw (4) and the mandrel (3).

15. The device according to claim 14, characterized in that, between at least one heatable inner jaw (9) and at least one heatable outer jaw (4) that surrounds the former concentrically, the pressure or pinch gap or annular gap is formed, which can be constricted at least in sections by means of at least one mechanism in such a way that at least part of the overlapping area (10) of the two casing sections (1, 2) can be exposed to the contact pressure and, at the same time, the jaws (4, 9) are heated.

16. The device according to claim 15, characterized in that the inner jaw (9) is arranged inside the mandrel (3) or else upon it.

17. The device according to claim 15, characterized in that the inner jaw (9) can be heated by a first heatable insert (5) and the outer jaw (4) can be heated by a second heatable insert (6).

18. The device according to claim 15, characterized in that the delimiting surfaces of the pinch or working gap are each formed by annular segmented inserts (5) arranged on the mandrel (3) or on the inner jaws (9) and by annular segmented inserts (6) of the outer jaws (4).

19. The device according to claim 13, characterized in that a jaw arrangement comprising multiple heatable jaws (4) is arranged around the free mandrel end (3').

20. The device according to claim 19, characterized in that the jaws (4) can be moved radially with respect to the mandrel (3) out of a starting position, in which the jaws (4) are at a relatively large distance from the mandrel (3), into a working position in which the jaws (4) tightly enclose the overlapping ends (1', 2') along a continuous line, as a result of which the ends (1', 2') are held in the pinch or working gap formed between the mandrel end (3') and the jaws (4).

* * * * *